United States Patent

Park

Patent Number: 5,912,817
Date of Patent: *Jun. 15, 1999

[54] WORKING AREA LIMITING METHOD IN MACHINE TOOL

[75] Inventor: Jun-hong Park, Jeonranam-do, Rep. of Korea

[73] Assignee: Samsung Electronics, Co., Ltd., Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/691,821

[22] Filed: Aug. 5, 1996

[30] Foreign Application Priority Data

Aug. 24, 1995 [KR] Rep. of Korea ........................ 95-26489

[51] Int. Cl.$^6$ .................................................. G05B 19/416
[52] U.S. Cl. .................................... 364/474.16; 364/474.3
[58] Field of Search ........................ 364/474.28, 474.29, 364/474.3, 474.32, 474.35, 474.36, 474.2, 474.19, 474.16, 167.01; 318/569–572, 626

[56] References Cited

U.S. PATENT DOCUMENTS

| | | | |
|---|---|---|---|
| 4,710,865 | 12/1987 | Higomura | 364/167.01 |
| 4,737,904 | 4/1988 | Ominato | 364/167.01 |
| 4,855,657 | 8/1989 | Isobe et al. | 364/474.28 |
| 5,070,288 | 12/1991 | Ikeda et al. | 364/474.34 |

*Primary Examiner*—Joseph Ruggiero
*Attorney, Agent, or Firm*—Burns, Doane, Swecker & Mathis LLP

[57] ABSTRACT

A method for limiting a working area of a CNC machine tool uses a servo controller for transferring a tool which periodically generates an interrupt signal to a main controller and the main controller periodically transmits position data to the servo controller according to an algorithm of a built-in interrupt routine. The algorithm of the interrupt routine comprises the steps of obtaining standstill position data by subtracting an accumulation value of output position data reflecting a predetermined acceleration/deceleration time constant from an accumulation value of target position data for every corresponding interrupt period, when the interrupt signal is input from the servo controller, and adding the subtraction result to current position data, and transmitting predetermined control data after comparing the standstill position data with predetermined boundary position data. Therefore, the working area of the machine tool can be controlled by software so that accurate numerical control can be continuously performed without causing physical impact to the system.

3 Claims, 3 Drawing Sheets

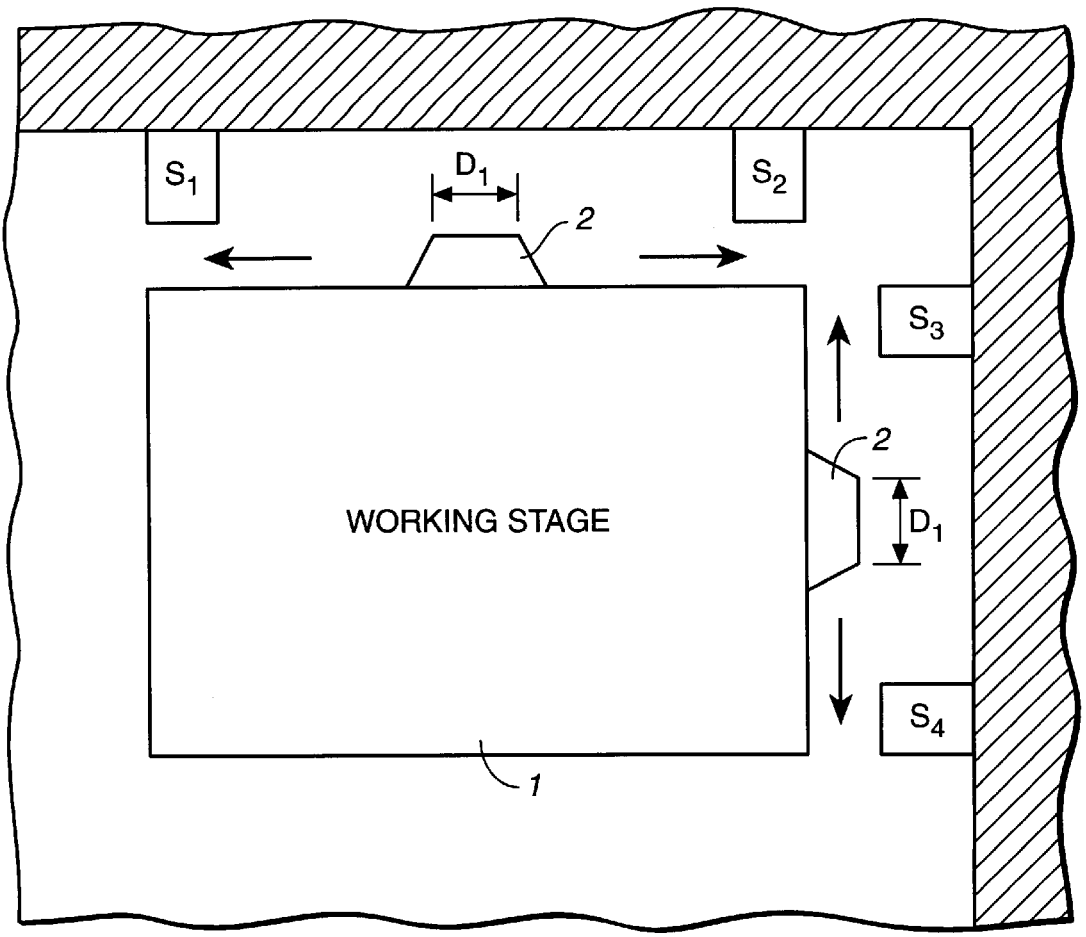
FIG._1
*(PRIOR ART)*
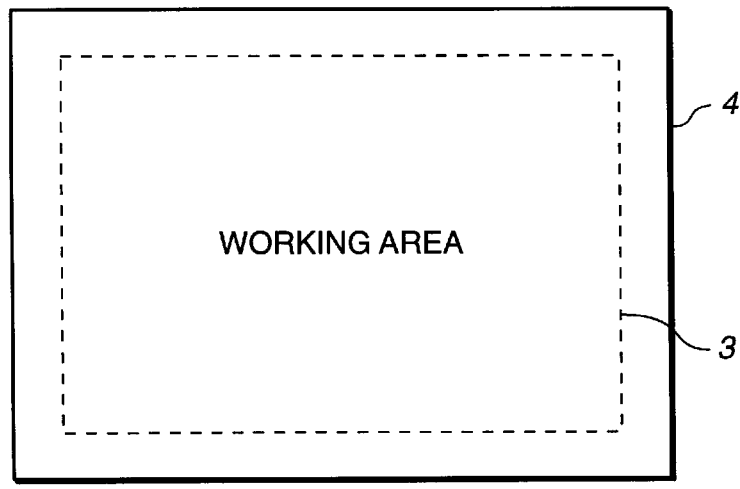
FIG._2

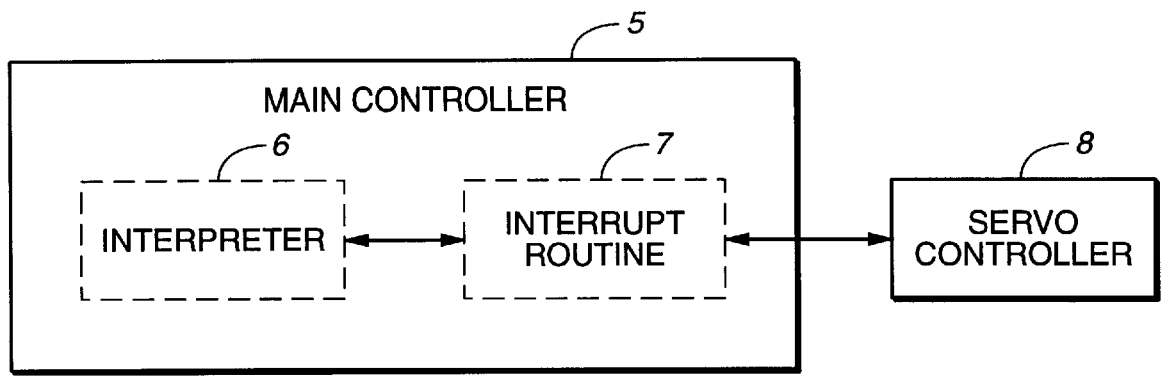
FIG._3
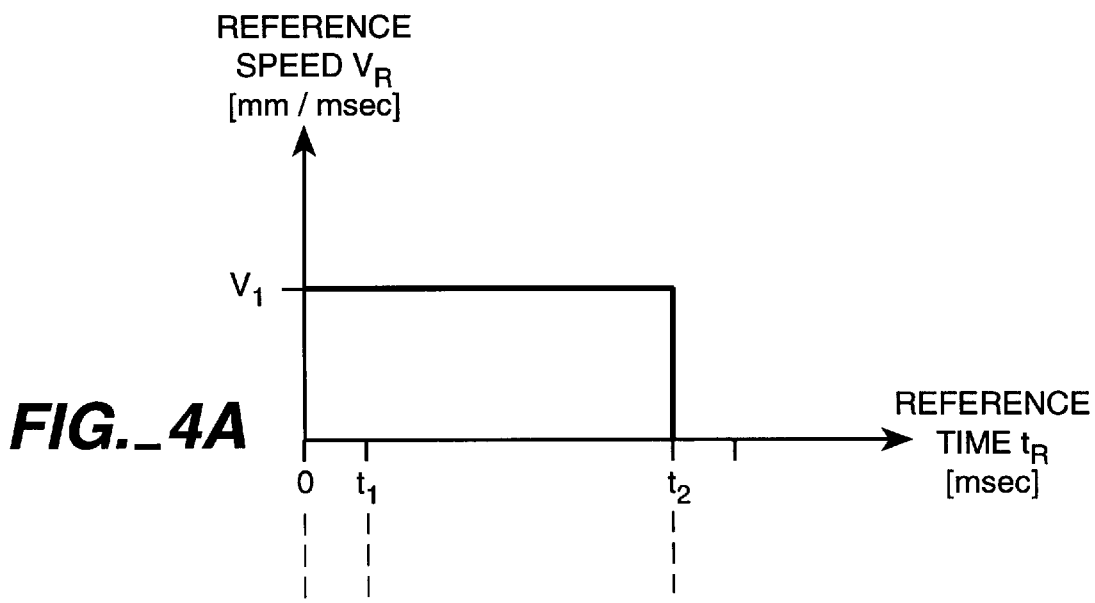
FIG._4A
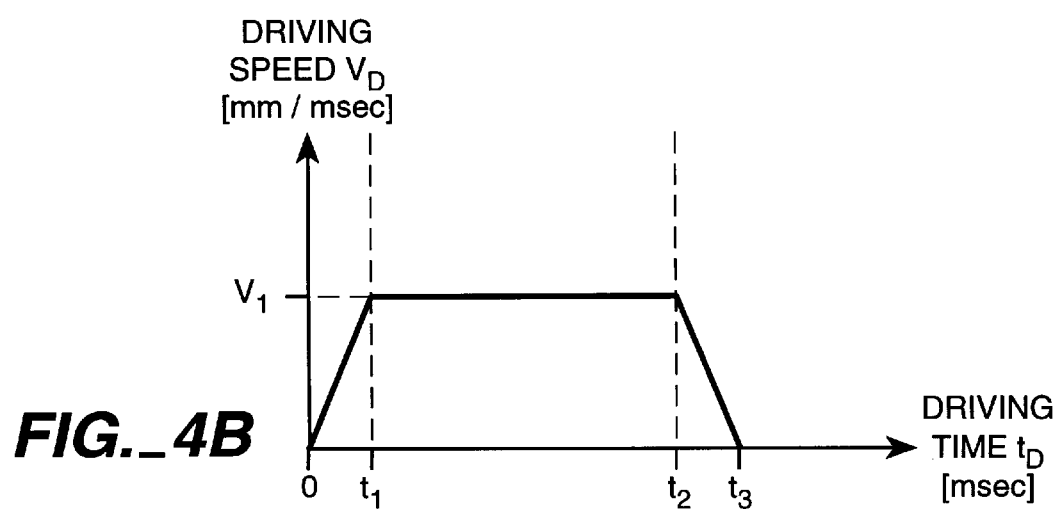
FIG._4B

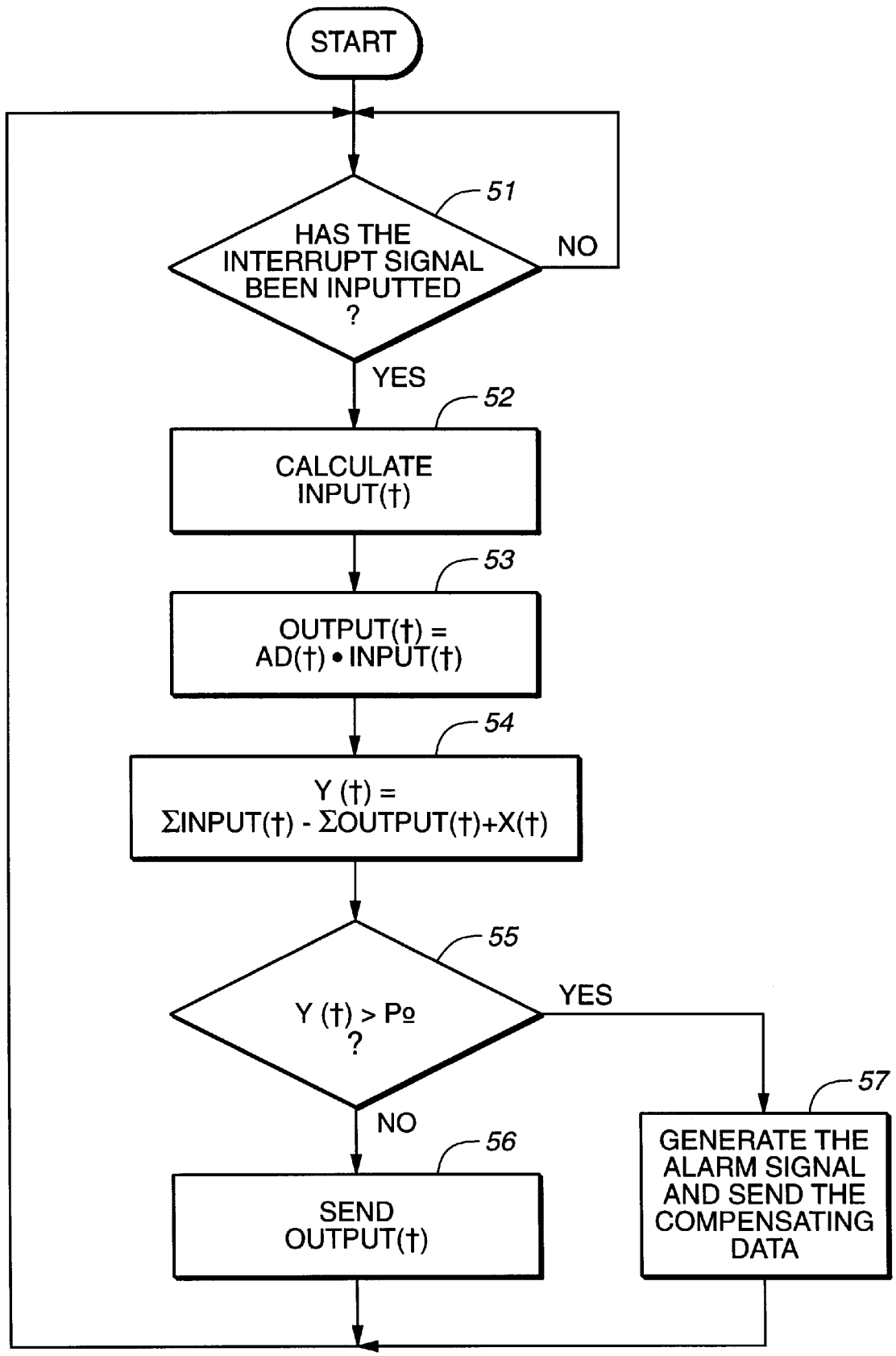
FIG._5

WORKING AREA LIMITING METHOD IN MACHINE TOOL

BACKGROUND OF THE INVENTION

The present invention relates to a method for limiting the working area of a computerized numerical control (CNC) machine tool.

Generally, the working area of a CNC machine tool is determined by specifications of the machine tool. When a tool of the machine tool is beyond the working area, mechanical damage may occur caused by impact to, e.g., a ball screw of a working stage, thus the boundaries of the working area becomes important. In order to limit the working area, limit switches have been installed at the boundaries of the working area.

FIG. 1 is a schematic diagram for explaining a conventional method for limiting the working area of a machine tool. As shown in the drawing, a plurality of limit switch S1, S2, S3 and S4 are arranged around the perimeter of a working area of a working stage 1. The limit switches are for detecting dogs 2 which move according to the movement of the tool (not shown). When a dog 2 is detected by the limit switch S1, S2, S3 or S4, a main controller (not shown) controls a servo controller (not shown) so that a pulse width modulation (PWM) signal is halted and simultaneously dynamic brakes (not shown) come into operation. Accordingly, the tool comes to a stop since the servo motor for transferring the tool ceases to run. Here, since the braking distance of the tool is shorter than the length D1 of the dogs 2, the tool can be safely stopped. The length D1 in a moving direction of the dog 2 is typically between 30–100 mm.

However, such a conventional method of limiting the working area has the following problems.

First, since the working area is determined according to the installation positions of the limit switches S1, S2, S3 and S4, it is difficult to change the boundaries of the working area. FIG. 2 shows an example of a working area 4 set by hardware which is different from the working area 3 which is actually required. According to the conventional working area limiting method, the hardware-set working area 4 appears to be larger than the actually required working area 3 since it is very difficult to change the hardware-set working area 4. Accordingly, the conventional CNC machine tool cannot perform a faster and more accurate control.

Second, since the tool is stopped abruptly by the dynamic brakes when one of the dogs 2 is detected by the switch S1, S2, S3 or S4, the machine tool system may receive an impact.

SUMMARY OF THE INVENTION

To solve the above problems, it is an object of the present invention to provide a method for limiting a working area of a CNC machine tool by software.

Accordingly, to achieve the above object, there is provided a method for limiting a working area of a machine tool in which a servo controller for transferring a tool periodically generates an interrupt signal to a main controller and the main controller periodically transmits position data to the servo controller according to an algorithm of built-in interrupt routines, wherein the algorithm of interrupt routines comprises the steps of: obtaining the rest position data Y(t) by subtracting an accumulation value ΣOutput(t) of the output position data Output(t) reflecting a predetermined acceleration/deceleration time constant from an accumulation value ΣInput(t) of the target position data Input(t) for every corresponding interrupt period when the interrupt signal is input from the servo controller, and adding the subtraction result ΣInput(t)−ΣOutput(t) to the current position data X(t); and transmitting the predetermined control data after comparing the standstill position data Y(t) with the predetermined boundary position data.

BRIEF DESCRIPTION OF THE DRAWINGS

The above object and advantages of the present invention will become more apparent by describing in detail a preferred embodiment thereof with reference to the attached drawings in which:

FIG. 1 is a schematic diagram for explaining a conventional method for limiting the working area in a machine tool;

FIG. 2 is a view illustrating a case in which the working area set by hardware is different from the working area that is actually required;

FIG. 3 is a schematic block diagram of a CNC control system for explaining a method for limiting a working area of a machine tool according to the present invention;

FIGS. 4A–4B are graphs for explaining the acceleration/deceleration function included in an interrupt routine of FIG. 3; and FIG. 5 is a flow chart for explaining the algorithm of the interrupt routine of FIG. 3.

DETAILED DESCRIPTION OF THE INVENTION

In a CNC system as shown in FIG. 3, a main controller 5 is comprised of an interpreter 6 and an interrupt routine 7 in a firmware. Various parameters set by a user of a machine tool such as the boundaries of a working area, a rest position of the tool and a reference velocity are converted into a predetermined data by the interpreter 6 and input to the interrupt routine 7. In a position controlling step, a servo controller 8 periodically transmits an interrupt signal to the main controller 5. Generally, interrupt signals are transmitted in intervals in a range between 8 msec to 16 msec. Accordingly, the interrupt routine 7 in the main controller 5 is performed, and the main controller 5 transmits periodic target position data from the interrupt routine 7 to the servo controller 8. The servo controller 8 controls a servo motor (not shown), to thereby transfer the tool to a predetermined rest position.

FIGS. 4A and 4B shows the acceleration/deceleration function included in the interrupt routine of FIG. 3. FIG. 4A is a graph indicating a reference time $t_R$ with respect to a reference velocity $V_R$ input by the user. Here, the rectangular area under the graph, the product of the set reference velocity $V_1$ and the corresponding reference time $t_2$, represents the movement distance of the tool to the rest positios, set by the user. When the interrupt routine 7 of FIG. 3 transmits target position data periodically to the servo controller 8 of FIG. 3 in accordance with the graph of FIG. 4A, impact to a mechanism of the machine tool may occur. Accordingly, to prevent any sudden impacts, the interrupt routine 7 of FIG. 3 reflects a predetermined acceleration/deceleration time constant to the graph of FIG. 4A so that the servo controller 8 of FIG. 3 periodically transmits the position data.

FIG. 4B is a graph indicating a driving time $t_d$ with respect to a driving velocity $V_D$ reflecting the predetermined acceleration/deceleration time constant. It is noted in FIG.

4B that acceleration and deceleration correction values are applied to a section from a transfer start point $t_0$ to $t_1$ and from $t_2$ to an end point $t_3$, respectively. The interrupt routine 7 transmits the position data periodically to the servo controller 8 as shown in the graph of FIG. 4B. For instance, when a jog is transferred in a CNC lathe, it is accelerated at a constant rate from a start point to the above driving velocity and decelerated at a constant rate from a predetermined braking point to a rest point. Here, since the rectangular area under the graph of FIG. 4A is the same as the trapezoidal area under the graph of FIG. 4B, the rest point set by user and the actual stop point is the same.

FIG. 5 is a flow chart showing the algorithm of the interrupt routine of FIG. 3. First, in step 51, the main controller 5 checks for an interrupt signal from the servo controller 8 of FIG. 3. When the interrupt signal is input, the target transferral position data Input(t) is calculated in step 52, that is, the tool is transferred during a corresponding interrupt period. Then, in step 53, an output position data Output(t) is obtained by multiplying the target transferral position data Input(t) by an acceleration/deceleration time constant AD(t) of a corresponding interrupt period. Next, in step 54, an accumulation value $\Sigma$ Output(t) of the output position data is subtracted from an accumulation value $\Sigma$Input(t) of the transferral target position data, and the subtraction result $\Sigma$Input(t)–$\Sigma$output(t) is added to current position data X(t) to obtain standstill position data Y(t). That is, Y(t)=$\Sigma$Input(t)–$\Sigma$Output(t)+X(t). In step 55, the standstill position data Y(t) is compared with the predetermined boundary position data $P_b$. If Y(t) is not greater than the predetermined $P_b$, the Output(t) is transmitted to the servo controller 8 of FIG. 3 in step 56. If the Y(t) proves to be greater than the predetermined $P_b$, a predetermined alarm signal is generated and concurrently predetermined correction data is transmitted to the servo controller 8 in step 57. Consequently, the working area of the machine tool can be controlled by software by performing the algorithm of the interrupt routine. Thus, accurate numerical control can be performed continuously without physically causing impact to the system.

The present invention is not limited to the above embodiment. For example, the above algorithm Y(t)=$\Sigma$Input(t)–$\Sigma$Output(t)+X(t) for obtaining the standstill position data Y(t) is appropriate for a jog transferral of a CNC lathe. In a handwheel transfer, an incremental transfer or a return-to-initial-position transfer, the algorithm which can be expressed as Y(t)=f(Y($\theta$)), Y($\theta$)=$\Sigma\theta_{input}$(t)–$\Sigma\theta_{output}$(t)+X($\theta$) can be applied. Here, Y(t) is standstill position data; Y($\theta$) is standstill position data having been reflected by a predetermined parameter; $\theta_{input}$(t) is target position data for transferring the tool during a corresponding interrupt period and having been reflected by the parameter; $\theta_{output}$(t) is output position data obtained by multiplying the $\theta_{input}$(t) by an acceleration/deceleration time constant of a corresponding interrupt period; and X($\theta$) is current position data having been reflected by the parameter.

As described above, in the method for limiting a working area of a machine tool according to the present invention, the working area of the machine tool can be controlled by software so that accurate numerical control can be continuously performed without physically causing impact to the system.

What is claimed is:

1. A method for limiting a working area of a machine tool in which a servo controller periodically transferring a tool generates an interrupt signal to a main controller and said main controller periodically transmits position data to said servo controller according to an algorithm of a built-in interrupt routine, wherein said algorithm of said interrupt routine comprises the steps of:

obtaining standstill position data Y(t) by subtracting an accumulation value $\Sigma$Output(t) of output position data Output(t) representing an acceleration/deceleration time constant from an accumulation value $\Sigma$Input(t) of target position data Input(t) for every corresponding interrupt period, when said interrupt signal is input from said servo controller, and adding the subtraction result $\Sigma$Input(t)–$\Sigma$Output(t) to current position data X(t); and transmitting predetermined control data after comparing said standstill position data Y(t) with predetermined boundary position data.

2. A method for limiting a working area of a machine tool as claimed in claim 1, wherein said standstill position data obtaining step comprises the steps of:

obtaining said target position data Input(t) when said interrupt signal is input from said servo controller;

obtaining said output position data Output(t) by multiplying said target position data Input(t) by the acceleration/deceleration time constant; and obtaining said standstill position data Y(t) by subtracting said accumulation value $\Sigma$Output(t) of said output position data Output(t) from said accumulation value $\Sigma$Input(t) of said target position data Input(t) and adding the subtraction result $\Sigma$Input(t)–$\Sigma$Output(t) to said current position data X(t).

3. A method for limiting a working area of a machine tool as claimed in claim 1, wherein said control data transmitting step comprises the steps of:

comparing said standstill position data Y(t) with said boundary position data;

if said Y(t) is less than or equal to said boundary position data, transmitting said Output(t) to said servo controller; and if said Y(t) is greater than said boundary position data, generating a predetermined alarm signal and concurrently transmitting correction data to said servo controller.

* * * * *